J. PARKER.
FLY-TRAP.
No. 6,811. Reissued Dec. 21, 1875.
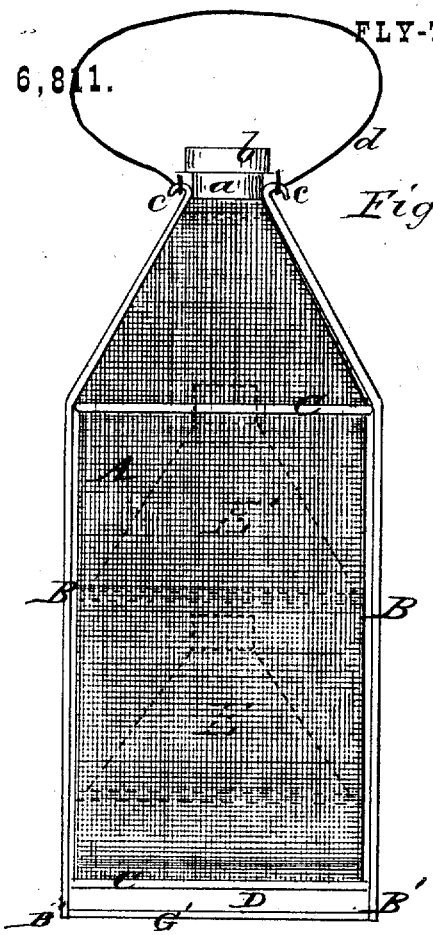
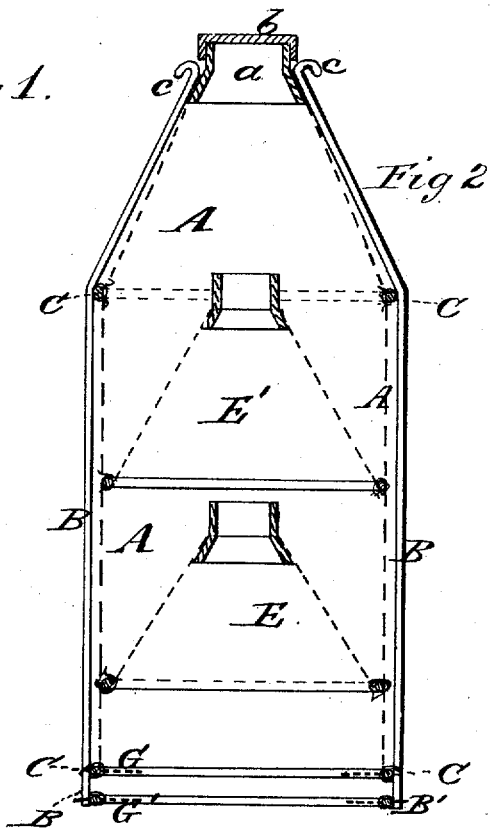
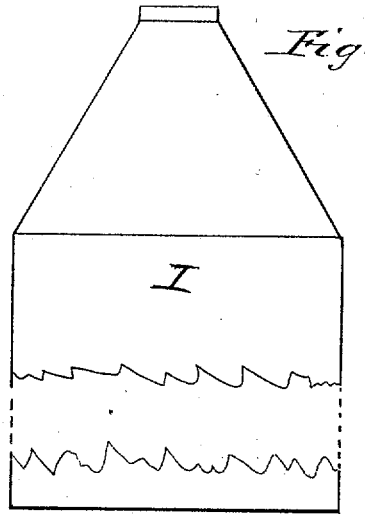
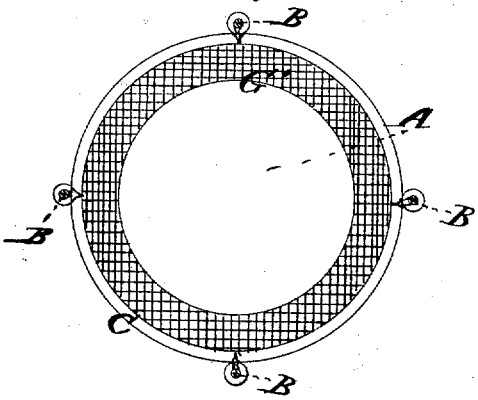
Witnesses
J. S. Slater
Harry C. Brock
Inventor
John Parker
by
Munn Henwick Lawrence
N. PETERS, PHOTO-LITHOGRAPHER, WASHINGTON, D. C.

UNITED STATES PATENT OFFICE.

JOHN PARKER, OF DUBUQUE, IOWA.

IMPROVEMENT IN FLY-TRAPS.

Specification forming part of Letters Patent No. 109,444, dated November 22, 1870; reissue No. 6,811, dated December 21, 1875; application filed November 23, 1875.

*To all whom it may concern:*

Be it known that I, JOHN PARKER, of Dubuque, in the county of Dubuque and State of Iowa, have invented a new and Improved Fly Trap; and I do hereby declare that the following is a full, clear, and exact description thereof, reference being had to the accompanying drawing, making a part of this specification, in which—

Figure 1 is a side elevation of the improved trap. Fig. 2 is a diametrical section of the same. Fig. 3 shows a cover which is used in connection with the trap. Fig. 4 is a section taken horizontally through the trap between its bottom gauze flanges.

Similar letters of reference indicate corresponding parts in the several figures.

The object of my invention is to so construct a fly-trap of wire-cloth, that, while the insects have free access to enter the trap, they will not be liable to escape from it again.

The nature of my invention consists in a wire-cloth case, having a wire-cloth cone within it, said case and cone being strengthened and united together by vertical and horizontal stays, and the case being closed at its top, and provided with an entrance-passage at its base, which leads to the cone, and the cone having an exit-passage which leads into the case. Second, it consists in a wire-cloth case having two cones within it, said case and cones being united together and strengthened by upright and horizontal stays, and the case being closed at its top, and provided with an entrance-passage at its base which leads to the cone, and each of the cones having an exit-passage above its base, leading into the case. It consists, third, in a hollow wire cone, which has an exit above its base, fastened to a wire-cloth case which is strengthened and supported at its base by an annular stay, and from top to bottom by upright stays. It consists, fourth, in vertical extensions below the wire-cloth case of a fly-trap, said extensions being below the base of the wire cone and base of the wire-cloth of the case, and serving to raise the edge of the case above the bait holder or plate, in such manner as to give the flies an entrance-passage to the bait on the holder and into the cone, and therefrom into the wire case. It consists, fifth, in the combination of a movable top or cover, a conical or flaring stay, having a vertical neck, a cylindrical wire-cloth case having upright and horizontal stays, and a wire cone within the wire case and connected to the case by suitable fastenings. Sixth, it consists in a wire-cloth annulus, placed above the base of the extensions or supports of the wire case, and attached to the wire cloth case, in combination with a wire-cloth cone within the case. It consists, seventh, in the combination of an adjustable wire-cloth annulus, placed at the base of the entrance-passage, and attached to the upright stays, in combination with a similar diaphragm placed at the top of said passage and attached to the case, and a wire-cloth cone within the case.

A represents a hollow outer case, which is of cylindrical form along a greater portion of its height, and terminates in a truncated cone at its top. This case is made of fine wire-cloth, which is supported and strengthened by upright narrow stays B and shallow horizontal annular stays C. The wire-cloth and its stays are connected together by means of suitable fastenings in any proper manner. There is a horizontal annular stay at the base of the wire cylinder, and another at the top of the cylinder or base of the truncated conical tip thereof. This case is open at its bottom, and provided at its top with a discharge-passage, *a*, and around the vertical neck of the stay, which forms this passage, a removable cover, *b*, is fitted. The lower ends B′ of the stays B are extended down below the wire-work of the case, so as to form an entrance-passage, D, between the lower edge of the cylinder and the bait-holder when the trap is set for catching flies, and the upper ends of the upright stays may be formed with bail-hooks *c c*, to which a swinging bail, *d*, may be hinged. Within the cylinder A, near its bottom, a hollow wire-cone, E, is placed and fastened by suitable means to the inside of the wire-work thereof, so that flies cannot pass between the cylinder and base of the cone. This cone is truncated at its top, and may be strengthened by annular stays at its base and upper end. Above the cone E another similar truncated cone, E′, may be arranged and fastened to the inside of the wire-work of the cylinder. At the bottom of the cylinder, and just above the entrance-passage D, a wire-cloth annulus, G may be arranged, and just below the entrance-passage, another similar wire-cloth diaphragm, G′, may be placed. This latter annulus may slip up and down on the extensions of the stays B, and thus serve to regulate the size of the entrance-passage. The trap would be very effective for common house-flies, without these annuli or parts G and G′, but for some species of flies the annuli make it more effective for general use. The outer case and cone are made of wire-work and light stays, so that the expense of manufacturing the traps may be very slight, and also that the light from the outside may attract the flies from the center to the circumference of the trap.

The trap being arranged over a shallow bait-holder, the flies enter the case A through the passage D, and, being attracted by the light above, fly through the first cone into the case; and if two cones are provided, they fly through the second cone from the space between the two cones into the space between the second cone and the top of the case. The return of the flies seldom happens, as they naturally fly out toward the circumference of the trap instead of toward the apex of the cones which is at the center of the trap.

The wire-cloth annuli are not much in the way of the flies while they are entering the trap, but as flies have a natural propensity to fly outward, these flanges prevent them passing back through the entrance-passage. The use of these flanges will be found especially beneficial with flies denominated "green flies," which generally remain at the bottom of the trap, instead of flying to the top, as is the characteristic of the common house-fly.

When a quantity of flies are entrapped they can be easily killed by placing the trap over a blazing fire kindled with straw or other light substance, or the fumes of burning sulphur may be employed, and in the use of this latter substance the trap may be covered by a sack, such as shown at I, Fig. 3, so that the sulphur fumes shall be confined within it. The dead flies are removed from the trap through the passage *a* by removing the cover *b* and inverting the trap.

What I claim as my invention is—

1. The wire-cloth case A, closed at top and open at bottom, and supported by upright and horizontal stays, and provided with a wire cone, E, having an exit above its base, substantially as and for the purpose herein described.

2. The wire cone E′, having an exit above its base, in combination with the wire cone E and wire case A, supported by upright and horizontal stays, substantially as and for the purpose herein described.

3. The wire cone E, having an exit above its base and fastened to the inner side of the wire case A, which is supported at its bottom by an annular stay, and from top to bottom by upright stays, substantially as and for the purpose described.

4. The wire-cloth fly trap A and E, provided with narrow extensions B′ below the bottom of its outer case A and its cone E, substantially as and for the purpose described.

5. The wire-cloth fly-trap A and E, the outer case A having a truncated conical top, with a vertical neck, and provided with a removable cover, which fits over the neck of the top, substantially as and for the purpose described.

6. The wire-cloth annulus G, in combination with the wire case A, and wire cone E, substantially as and for the purpose described.

7. The annulus G′, in combination with the annulus G, wire extensions B′, case A, and wire cone E, substantially as and for the purpose described.

In testimony that I claim the foregoing, I have hereunto set my hand this 20th day of November, 1875.

JOHN PARKER.

Witnesses:
ABSALOM CAIN,
GEO. L. DICKINSON.